(12) United States Patent
Li et al.

(10) Patent No.: US 12,127,135 B2
(45) Date of Patent: Oct. 22, 2024

(54) DATA-DRIVEN UPLINK POWER CONTROL IN A WIRELESS NETWORK

(71) Applicant: NTT DOCOMO, INC., Tokyo (JP)

(72) Inventors: Zheda Li, Palo Alto, CA (US); Haralabos Papadopoulos, Palo Alto, CA (US); Chenwei Wang, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 353 days.

(21) Appl. No.: 17/707,136

(22) Filed: Mar. 29, 2022

(65) Prior Publication Data
US 2022/0322242 A1 Oct. 6, 2022

Related U.S. Application Data

(60) Provisional application No. 63/171,005, filed on Apr. 5, 2021.

(51) Int. Cl.
*H04W 52/24* (2009.01)
*H04W 52/14* (2009.01)

(52) U.S. Cl.
CPC ....... *H04W 52/243* (2013.01); *H04W 52/146* (2013.01); *H04W 52/242* (2013.01)

(58) Field of Classification Search
CPC . H04L 27/2601; H04L 12/189; H04L 5/0055; H04L 12/1886; H04L 5/0042; H04L 61/5069; H04L 5/00; H04L 1/1812; H04L 1/1822; H04L 1/1845; H04L 1/1864; H04L 1/1877; H04L 2001/0093; H04L 1/18; H04L 43/0894; H04L 43/55; H04L 41/147; H04L 41/5009; H04L 41/5019; H04L 1/00; H04W 28/0268; H04W 28/10;
(Continued)

(56) References Cited

U.S. PATENT DOCUMENTS

| 8,611,943 | B2 * | 12/2013 | Larsson | H04W 52/12 |
| | | | | 455/67.11 |
| 9,510,240 | B2 * | 11/2016 | Lorca Hernando | |
| | | | | H04W 28/0808 |
| 9,661,580 | B2 * | 5/2017 | Tie | H04W 52/24 |
| 2010/0227563 | A1 * | 9/2010 | Nibe | H04W 52/36 |
| | | | | 455/65 |
| 2013/0301584 | A1 * | 11/2013 | Addepalli | H04W 72/53 |
| | | | | 370/329 |

(Continued)

FOREIGN PATENT DOCUMENTS

| EP | 2102996 B1 * | 11/2013 | ............ H04W 52/08 |
| WO | WO-2017089897 A1 * | 6/2017 | ........... H04B 7/0404 |
| WO | WO-2021223865 A1 * | 11/2021 | ............ H04W 52/08 |

*Primary Examiner* — Nathan S Taylor
(74) *Attorney, Agent, or Firm* — Womble Bond Dickinson (US) LLP

(57) ABSTRACT

Methods and apparatuses for data-driven uplink power control in a wireless network are described. In some embodiments, a network entity in a communication system supporting the uplink power control by the design of target signal-to-interference-plus-noise-ratio (TSIR) patterns for one or more cells in the target area, where the network entity comprises: a transceiver to receive reported traffic data from one or more cells in the target area; and a TSIR generation engine having one or more processors configured to automatically generate the one or more signal-to-interference-plus-noise-ratio (TSIR) patterns for the one or more cells of the target area in response to one or more trigger conditions, wherein the transceiver component is operable to transmit at least one of the one or more TSIR patterns to one or more cells in the target area.

20 Claims, 11 Drawing Sheets

(58) Field of Classification Search
CPC ..... H04W 76/10; H04W 80/02; H04W 76/12; H04W 28/02; H04W 80/10; H04W 76/20; H04W 4/40; H04W 4/46; H04W 4/44; H04W 40/22; H04W 40/248; H04W 40/24; H04W 4/06; H04W 16/28; H04W 28/04; H04W 28/18; H04W 72/23; H04W 72/30; H04W 72/00; H04W 72/04; H04W 24/08; H04W 52/146; H04W 52/242; H04W 52/243; H04W 52/241; H04W 52/14; H04W 52/24; H04W 24/02; H04W 48/08; H04W 52/06; B60W 60/001; B60W 60/00; G05D 1/02; G01S 5/14; G01S 5/06; H04B 17/318; H04B 17/345; H04B 17/373

See application file for complete search history.

(56) References Cited

U.S. PATENT DOCUMENTS

| | | | | |
|---|---|---|---|---|
| 2014/0204861 | A1* | 7/2014 | Tie | H04W 52/241 |
| | | | | 370/329 |
| 2015/0296465 | A1* | 10/2015 | Larsson | H04W 52/245 |
| | | | | 455/442 |
| 2015/0333854 | A1* | 11/2015 | Yang | H04B 17/373 |
| | | | | 370/252 |
| 2017/0238265 | A1* | 8/2017 | Yang | H04W 52/241 |
| | | | | 455/522 |
| 2018/0131428 | A1* | 5/2018 | Chen | H04L 5/0007 |
| 2018/0351605 | A1* | 12/2018 | Liang | H04B 7/0617 |
| 2018/0352561 | A1* | 12/2018 | Barabell | H04B 17/318 |
| 2019/0357232 | A1* | 11/2019 | Raghothaman | H04L 5/0048 |
| 2020/0099409 | A1* | 3/2020 | Nguyen | H04B 1/123 |

* cited by examiner

DATA-DRIVEN UPLINK POWER CONTROL IN A WIRELESS NETWORK

RELATED APPLICATION

The present application claims the benefit under 35 USC 119(e) of U.S. Provisional Patent Application No. 63/171,005, filed Apr. 5, 2021, which is incorporated by reference in its entirety.

FIELD OF THE INVENTION

Embodiments of the present invention relate to the field of wireless communication; more particularly, embodiments of the present invention relate to generating target signal-to-interference-plus-noise ratio (TSIR) patterns for use in uplink power control in a wireless communication system.

BACKGROUND

Target signal-to-interference-plus-noise ratio (TSIR) patterns are used in cellular networks to achieve a desired network performance. These TSIR patterns have been created by engineers heuristically adjusting existing target SINR patterns and testing their impacts through real experiments deployed over the cellular network. In other words, the engineers manually adjust the TSIR tables, which involves tremendous human intervention and a high cost of human resources. Also, there is questionable performance a no guarantee that a certain performance requirement will be met as a result of this process. Lastly, this process is hard to scale if trying to perform a joint design for many cells.

SUMMARY

Methods and apparatuses for data-driven uplink power control in a wireless network are described. In some embodiments, a network entity in a communication system supporting the uplink power control by the design of target signal-to-interference-plus-noise-ratio (TSIR) patterns for one or more cells in the target area, where the network entity comprises: a transceiver to receive reported traffic data from one or more cells in the target area; and a TSIR generation engine having one or more processors configured to automatically generate the one or more TSIR patterns for the one or more cells of the target area in response to one or more trigger conditions, wherein the transceiver component is operable to transmit at least one of the one or more TSIR patterns to one or more cells in the target area.

In some embodiments, a method for controlling uplink power between in a communication system, comprises: receiving reported traffic data from one or more cells in a target area; automatically generating the one or more TSIR patterns for the one or more cells of the target area in response to one or more trigger conditions; and transmitting at least one of the one or more TSIR patterns to one or more cells in the target area.

In some embodiments, one or more non-transitory computer readable storage media having instructions stored thereupon which, when executed by a system having at least a processor and a memory therein, cause the system to perform operations for controlling uplink power between in a communication system that comprise: receiving reported traffic data from one or more cells in a target area; automatically generating the one or more TSIR patterns for the one or more cells of the target area in response to one or more trigger conditions; and transmitting at least one of the one or more TSIR patterns to one or more cells in the target area.

In some embodiments, a base station comprises: a transceiver to collect RSRP reports of served UEs (UEs); and one or more processors coupled to the transceiver and operable to: estimate interference received from one or more UEs served by another base station, determine a TSIR from a table created using, for example, the method described above, calculate UE transmit power for one or more of the UEs, and send information indicating the UE transmit power to the one or more UE

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments disclosed herein include an automation framework to generate, and potentially optimize, target SINR (signal-to-interference-plus-noise-ratio) (TSIR) pattern(s) for one or more cells based on the historical traffic data of a wireless communication network (e.g., a cellular network). In some embodiments, the historical traffic data consists of Reference Signal Received Power (RSRP) reports from user equipments (terminal) UEs and estimated interference at the eNB. In some other embodiments, these TSIR patterns are signal-to-interference ratio (SIR) patterns without the noise ratio.

In some embodiments, the TSIR pattern(s) will be used by eNB(s) (e.g., base stations, etc.) to determine the uplink transmit power of UE in the real-time operation of a cellular network. The techniques disclosed herein provide one or more advantages that include: 1) significantly improving the network performance, e.g., throughput; and 2) providing high efficiency in designing TSIR patterns for a large cellular network through automation framework The TSIR patterns can easily adapt to different use cases and applications. For example, with application-specific traffic data, e.g., for VoLTE, embodiments described herein efficiently generate the TSIR patterns for a corresponding application. Therefore, the use of the techniques disclosed herein not only improves the performance of existed network, but is also applicable to 5G and beyond 5G networks. Furthermore, the framework disclosed herein is flexible to accommodate different network performance requirements and can be extended and generalized to automatically generate/optimize target SINR patterns with spatial selection, which incorporates the impact of antenna array at the eNB (e.g., a large antenna array configured at the eNB is a feature for 5G and beyond 5G networks).

Figure 1:
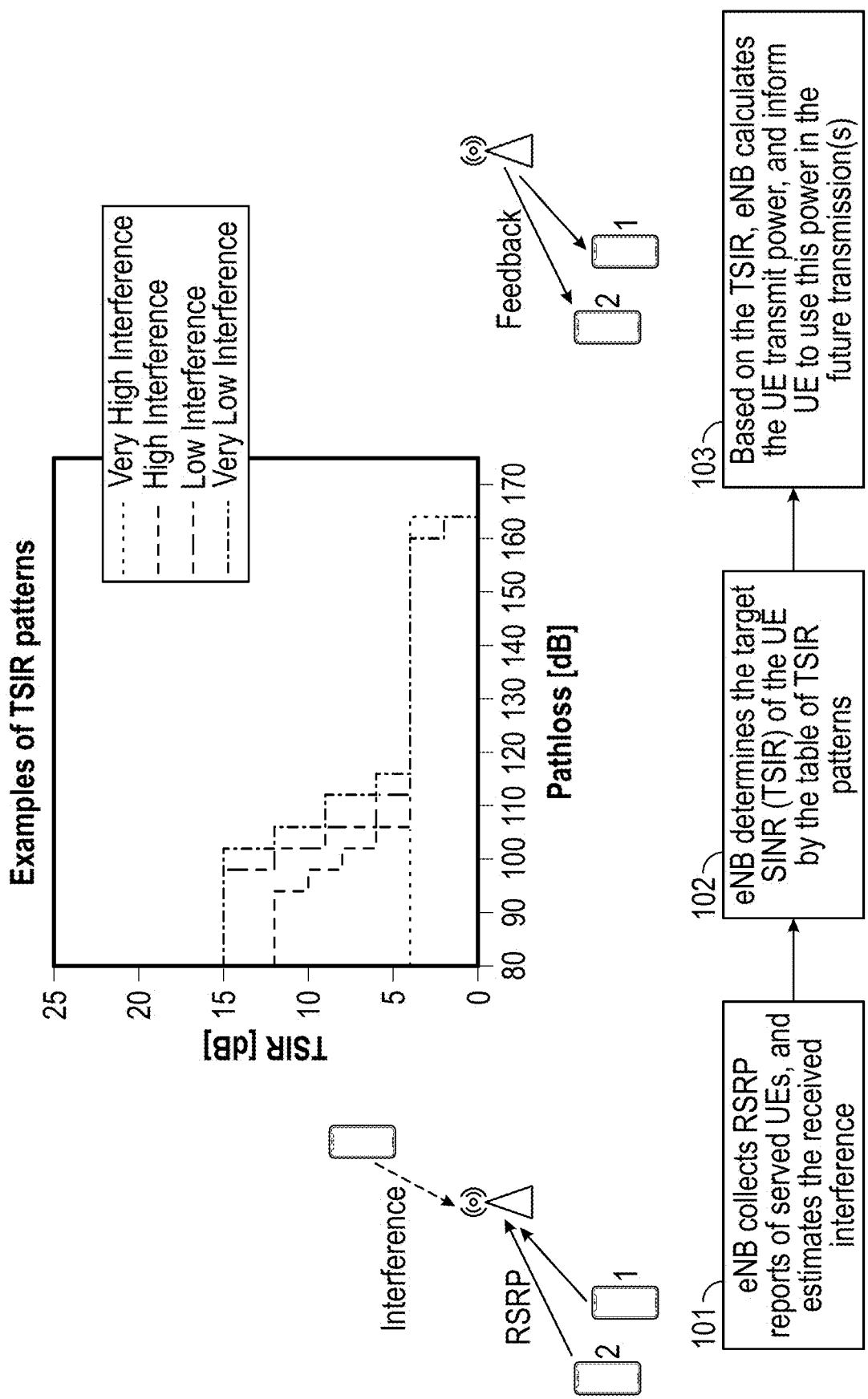
FIG. 1 is a dataflow diagram illustrating part of one embodiment of a cellular uplink power control process.

FIG. 1 is a dataflow diagram illustrating part of one embodiment of a cellular uplink power control process. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In one embodiment, the process is performed by an eNB (e.g., base station).

Referring to FIG. 1, an eNB collects RSRP reports of served UEs and estimates the received interference (processing block 101). After the collection RSRP reports of served UEs, the eNB determines a target SINR (TSIR) of one (or more) of its served UEs using a table of TSIR patterns (processing block 102). Based on the TSIR, the eNB calculates the UE transmit power and informs the UE that it is to use this transmit power in future transmission(s) (processing block 103).

In some embodiments, the network control unit (CU) generates the tables of TSIR patterns and provides them to the eNBs. In some embodiments, the network CU generates the tables based on reported traffic and/or interference data from cells.

Figure 2:
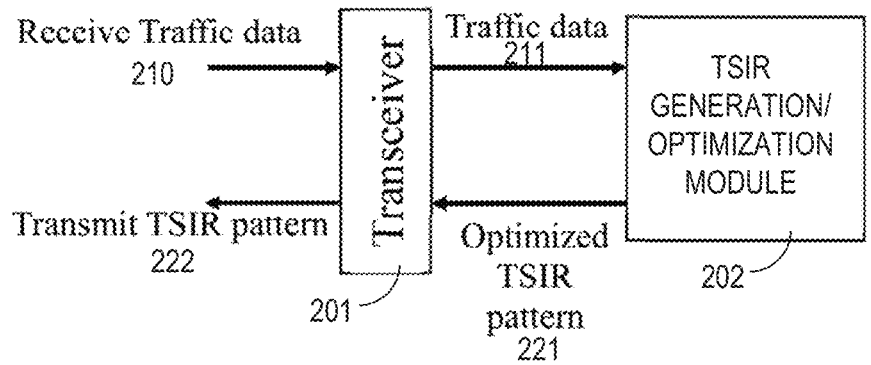
FIG. 2 illustrates one embodiment of a control unit (CU) architecture.

A network central unit (CU) includes a transceiver component to communicate with eNBs, which is able to receive the reported traffic data from cells and exchange the designed tables of TSIR patterns with the cells. In some embodiments, a CU includes a generation/optimization module to design the TSIR patterns of target cells based on the collected traffic data. FIG. 2 illustrates one embodiment of a control unit (CU) architecture. Referring to FIG. 2, a transceiver 201 receives traffic data 210 and provides traffic data 211 to a TSIR generation/optimization module 202. TSIR generation/optimization module 202 generates TSIR patterns (e.g., optimized TSIR patterns) for use by the eNBs in the wireless communication system. TSIR generation/optimization module 202 outputs TSIR pattern 221 (e.g., an optimized TSIR pattern) to transceiver 201, which transmits TSIR pattern 221 as transmit TSIR pattern 222. In some embodiments, transceiver 201 sends the transmit TSIR pattern 222 to an eNB. Note that the term of TSIR pattern is equivalent to the target-SINR pattern for purposes herein, and both terms are used herein interchangeably.

In some embodiments, the functionality of CU depicted herein is embedded into other network central units in the communication system.

Figure 3:
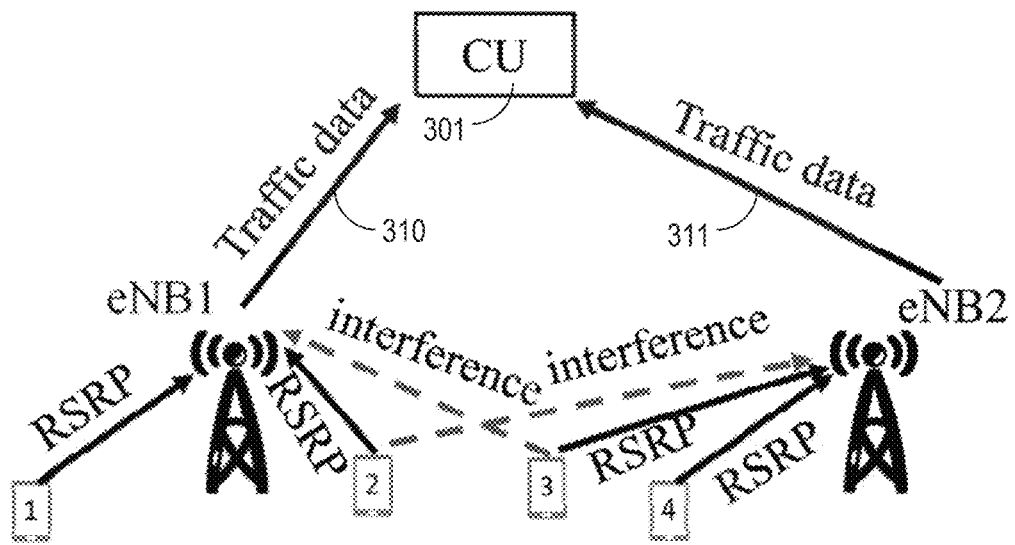
FIG. 3 illustrates an example of eNBs reporting traffic data to a CU.

In some embodiments, a procedure for designing TSIR patterns involves mainly three phases. At the first phase, the CU collects the reported traffic data from one or more eNBs. FIG. 3 illustrates an example of eNBs reporting traffic data to a CU. In some embodiments, the traffic data consists of historical measurements and/or estimations that can be used to infer the historical pathloss of user terminals and uplink interference. Referring to FIG. 3, UEs 1 and 2 send traffic data (e.g., RSRP reports) to eNB1. When UE 2 sends the traffic data to eNB1, it causes interference with eNB2. Similarly, UEs 3 and 4 send traffic data (e.g., RSRP reports) to eNB2. As a result of UE 3 sending the traffic to eNB2, interference is caused with eNB1. In some embodiments, the reported traffic data includes interference data of neighboring cells controlled by or in the vicinity of one base station (e.g., collocated cells and/or sectors, etc.).

After collecting the RSRP reports of UEs 1 and 2, the eNB1 sends traffic data 310 to CU 301. Also, after collecting RSRP reports of UEs 3 and 4, eNB2 sends traffic data 311 to CU 301. The reporting of traffic data can be performed on-demand or periodically. Based on traffic data 310 and 311, CU 301 generates TSIR patterns for eNB1 and eNB2.

Figure 4:
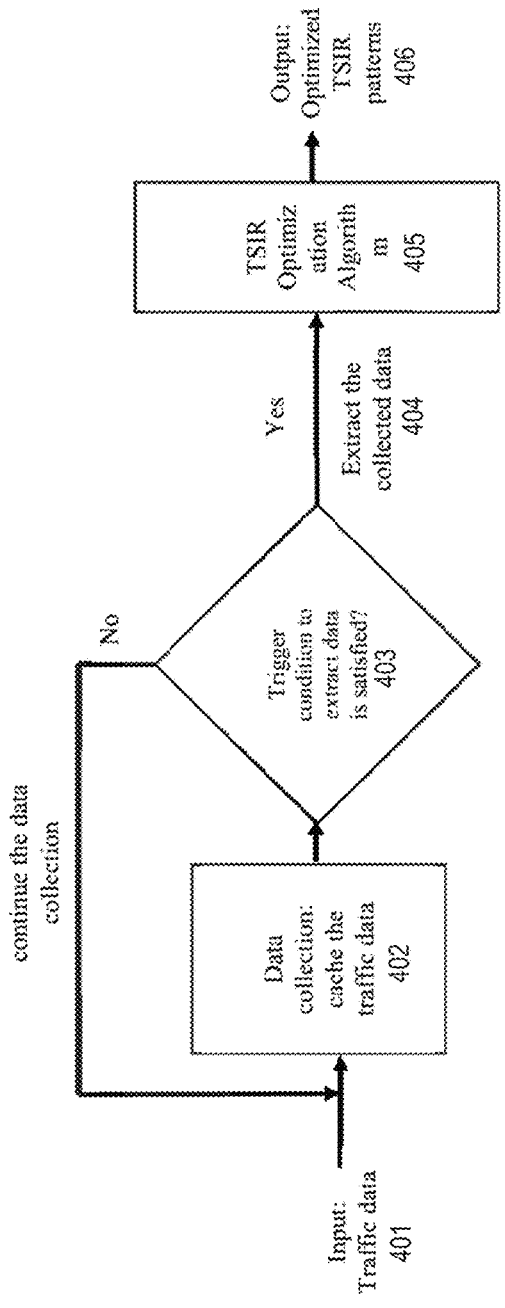
FIG. 4 is a data flow diagram of one embodiment of a TSIR generation process performed by a control unit.

At the second phase, in response to the traffic data from the eNB1 and eNB2, the CU uses a TSIR generation/optimization module to generate the TSIR patterns for the cellular network with one or more cells. FIG. 4 is a data flow diagram of one embodiment of a TSIR generation process performed by a control unit. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. Referring to FIG. 4, traffic data 401 is input to data collection module 402, which continuously caches the traffic data. Processing logic monitors one or more trigger conditions and then determines whether a trigger condition to extract data has been satisfied (403). If not, the process transitions back to processing block 402 where data collection continues. If a triggered condition to extract the data has been satisfied, processing logic extracts the collected data (404) and performs a TSIR generation/optimization algorithm (405) on the extracted data to generate, and potentially optimize, TSIR patterns 406 that are output by the CU.

A number of specific trigger conditions may be used. One trigger may involve the expiration of a predetermined period of time. For example, but not limited to, traffic data can be extracted after a certain amount of time has passed. This may be indicated by a time counter or other timer have finished (e.g., reached a predetermined count). Different time periods can respectively represent different scenarios, e.g., peak traffic hours and late night at weekdays, which leads to scenario-driven design of TSIR patterns by the TSIR generation/optimization engine. Another example of a trigger condition is the detection of one or more network anomalies, e.g., quality-of-experience (QoE) (e.g., average SINR) of one or more applications is below than a certain threshold and/or handover occurrence rate is above a certain threshold. In some embodiments, the trigger condition is set by operators.

The engine of the CU may be implemented either online or offline. For an online system, in some embodiments, a system operator specifies the periodicity to update TSIR patterns (e.g., one week, one day, one month, etc.) and the TSIR generation is performed based on the collected traffic data within a periodic cycle.

Figure 5:
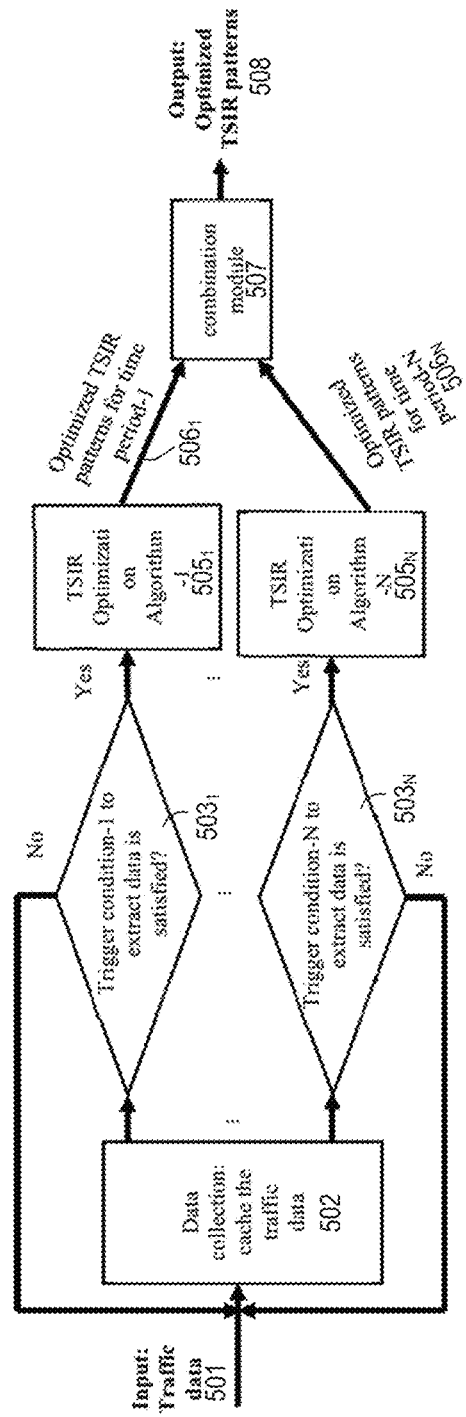
FIG. 5 is a data flow diagram of another TSIR generation process performed by a control unit.

FIG. 5 is a data flow diagram of another TSIR generation process performed by a control unit. In this case, the CU TSIR generation/optimization module uses multiple independent branches to generate the TSIR patterns of cells for respective trigger conditions. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 5, traffic date 501 is input to data collection module 502 that continuously captures the traffic data. While data is being collected, processing logic monitors trigger conditions-1 to trigger condition-N and determining whether a trigger condition has occurred so that data can be extracted and used for generating TSIR patterns (processing block $502_{1-N}$). For example, if trigger condition-1 is satisfied, as determined a processing block $503_1$, then data is extracted and TSIR generation/optimization algorithm $505_1$ is performed to generate TSIR patterns for time period-1 (5061). Similarly, if trigger condition-N is satisfied by determined by processing block $503_N$, then data is extracted and TSIR generation/optimization algorithm $505_N$ is performed to generate TSIR patterns for time period-N ($506_N$).

In some embodiments, each branch's trigger condition is used to check whether its specified time interval has finished collecting data. The number of branches, e.g., N in FIG. 5, is application specific and may vary (e.g., N equals 2, 3, 4, 6, etc.).

Furthermore, in some embodiments, one or more of the branches has multiple trigger conditions that are met to extract data. Later, a combination module can be used to merge TSIR patterns from parallel branches and generate one TSIR pattern per cell (or merge TSIR patterns to a reduced number of TSIR patterns that one cell can support). In some embodiments, merging TSIR patterns is performed by merging tables. For example, in some embodiments, where multiple TSIR patterns for different time periods are generated, a combination module 507 merges the outputs of different branches together to generate TSIR patterns 508 as an output of the TSIR generation/optimization module. In one embodiment, the combination module 507 may perform averaging or weighted averaging in order to combine the optimized TSIR patterns for time periods 1-10. Such mergers may be performed by quantizing values from multiple patterns (e.g., tables) to create values for the tables. Other well-known combining methods may be used.

Figure 6:
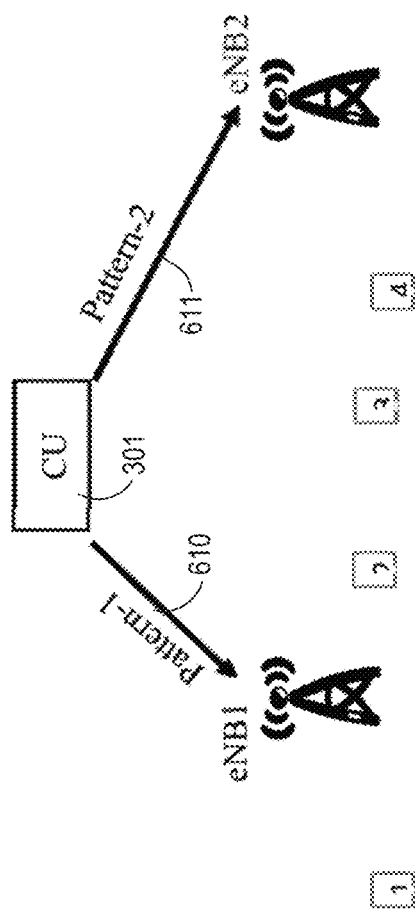
FIG. 6 is an example of a CU transmitting designed TSIR patters to eNBs.

At the third phase, the CU transmits the designed TSIR patterns to target cells. FIG. 6 is an example of a CU transmitting designed TSIR patters to eNBs. Referring to FIG. 6, CU 301 sends pattern-1 (610) to eNB1 and pattern-2 (611) to eNB2. In some embodiments, the eNB updates its stored TSIR pattern(s).

In some embodiments, the eNB uses the stored TSIR pattern as the look-up table for the eNB to specify the uplink transmit power of user terminals. In some embodiments, the message of the TSIR pattern can also be conveyed with other control information to configure the cell.

In some embodiments, a TSIR pattern generation algorithm first optimizes the parametric TSIR functions and then properly extract the TSIR patterns from the corresponding parametric TSIR functions. In some embodiments, the extraction of the TSIR patterns is performed in part by sampling the data from the parametric TSIR functions. In some embodiments, the TSIR function is a function of uplink interference and pathloss of user terminal:

$$\text{TSIR}_{t,ik} = G_i(I_{ti}, L_{t,i}),$$

where target-SINR of kth user terminal (UE) associated with cell-I at time-t is a function of cell-i's uplink interference $I_{ti}$ and $\text{UE}_k$'s pathloss $L_{t,ik}$. An example of TSIR function G can be a linear model as follows:

$$\text{TSIR}_{t,ik} = a_i I_{ti} + b_i L_{t,ik} [\text{dB}],$$

where $a_i$ is the function parameter of cell, with respect to the interference and $b_i$ is the function parameter of cell$_i$ with respect to the UE pathloss. Another example of parametric TSIR function is to consider the pathloss-group-specific parameters:

$$\text{TSIR}_{t,ik} = a_i I_{ti} + b_{i,g} L_{t,ik} [\text{dB}],$$

where g represents the pathloss group index to which the $\text{UE}_k$ belongs. Note that various methods of UE grouping via the feature of pathloss may be used. For example, UEs can be clustered into groups by specified pathloss ranges. One or more well-known machine-learning-based clustering methods (e.g., Kmeans) can also be applied to separate UEs into groups.

In some embodiments, the CU improves, and potentially optimizes, parametric TSIR functions in order to generate and/or update TSIR patterns. This is discussed in more detail below.

Examples of TSIR Generation/Optimization Algorithms Based on the Traffic Data

Figure 7:
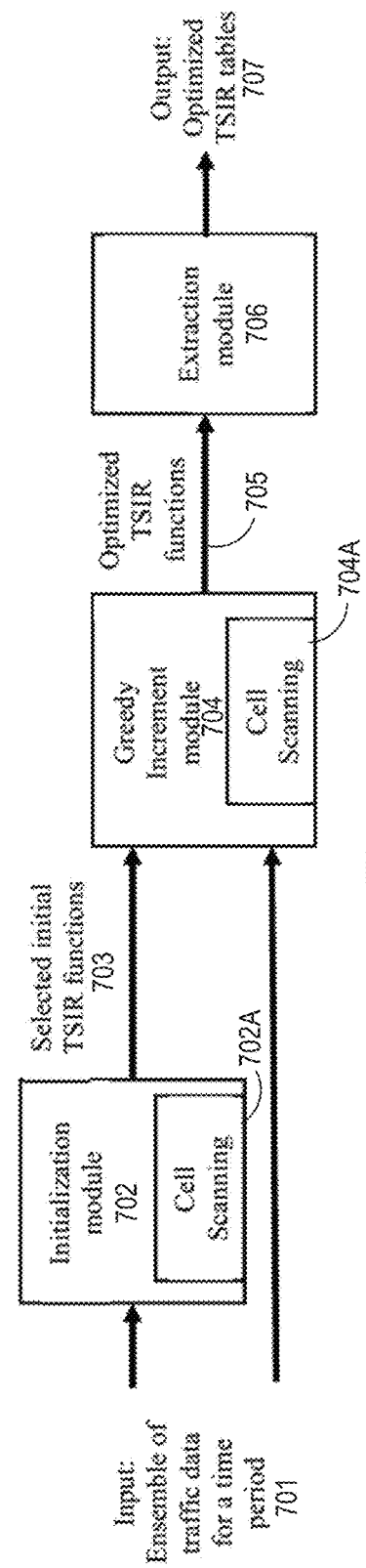
FIG. 7 illustrates one embodiment of a TSIR optimization algorithm with three main modules.

In some embodiments, the TSIR generation/optimization algorithm comprises, but not limited to, three main modules. FIG. 7 illustrates one embodiment of a TSIR optimization algorithm with three main modules. In some embodiments, the modules implemented, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 7, the three modules include an initialization module 702, a Greedy increment module 704, and an extraction module 706 that are used to generate and/or optimize parametric TSIR functions for a fixed PI requirement. In some embodiments, initialization module 702 searches the proper initial TSIR function parameters that can be used to achieve a conservative (e.g., low) requirement of certain performance index (PI), such as, for example, but not limited to, average SINR. In some embodiments, the searching is performed by using a random initialization of TSIR function parameters. This is described in more detail below. In some embodiments, Greedy increment module 704 iteratively enhances the required PI(s), during which for each iteration, Greedy increment module 704 improves, and potentially optimizes, the TSIR function parameters to satisfy the updated PI. Based on the optimized parametric TSIR functions, in some embodiments, extraction module 706 extracts the discrete TSIR values to form the tables of TSIR patterns, which satisfy the format requirements of specific implementations.

At the beginning of the TSIR generation, initialization module 702 searches a proper set of initial TSIR functions, which will be fed to Greedy increment module 704, along with the traffic data. As certain PI(s) are changed to meet a network utility (e.g., cost function), Greedy increment module 704 iteratively optimizes the parametric TSIR functions until a predetermined event (e.g., the saturation of uplink transmit power) and generates the generated (e.g., optimized) TSIR functions. These parametric functions are fed into extraction module 706 to form the TSIR patterns/tables with the required formats. In some embodiments, the required formats of TSIR patterns/tables depend on the specific implementations.

In some embodiments, with fixed performance-index (PI) requirement, TSIR parametric functions are improved, and potentially optimized, by minimizing the cost or maximizing the utility of the target area. For example, with a fixed average SINR requirement, the TSIR parametric functions are improved, and potentially optimized, by minimizing the total leakage interference of the target area. In another example, with a fixed uplink power constraint, TSIR parametric functions are improved, and potentially optimized, by maximizing the overall throughput of the target area. Other problem formulations to improve and/or optimize TSIR parametric functions may be used.

In some embodiments, cell scanning modules 702A and 704A are used by initialization module 702 and Greedy increment module 704, respectively. In some embodiments, cell scanning modules 702A and 704A are implemented, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, initialization module 702 includes cell-scanning 702A that scans through the various cells to ensure that initial TSIR function 703 are selected for each of the cells. The ensemble of traffic data for time period 701 as well as the selected initial TSIR function 703 are received by Greedy increment module 704. Greedy increment module determines TSIR functions 705 and sends them to extraction module 706. In some embodiments, Greedy increment module 704 also includes self-scanning module 704A to scan to the various cells to make sure TSIR functions 705 are generated for each of the cells.

Figure 8A:
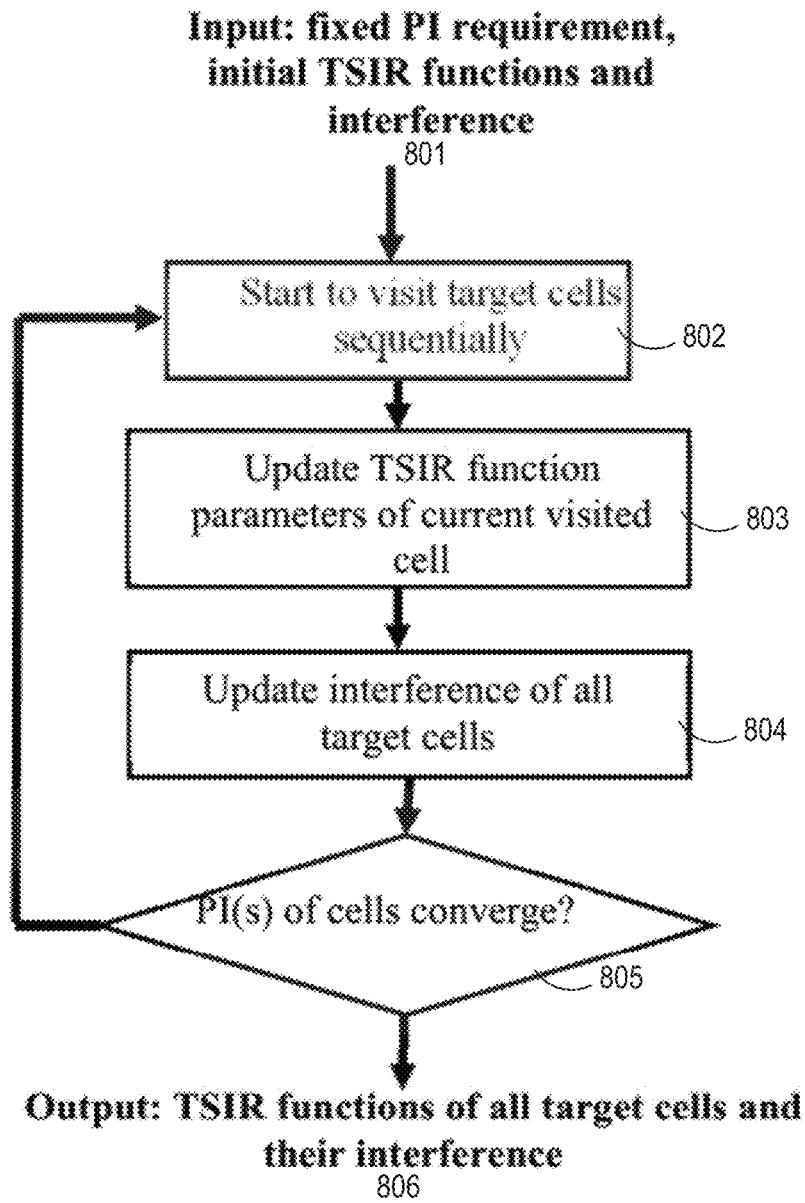
FIG. 8A illustrates a data flow diagram of one embodiment of a cell scanning module.

FIG. 8A illustrates a data flow diagram of one embodiment of a cell scanning module. In some embodiments, the module implemented, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 8A, the process performed by self-scanning module starts by visiting target cells sequentially in response to receiving fixed PI requirement, initial TSIR functions and interference information (801). In some embodiments, the initial TSIR functions parameters are randomly generated following a certain distribution. Various distributions of function parameters or other methods to generate initial TSIR functions may be used.

Processing logic determines a first visited cell (processing block 802), updates the TSIR function parameters of the current visited cell (processing block 803), and updates the interference of all the target cells (processing block 804). As the TSIR optimization is operated over a target area with multiple target cells, the target cell is the cell whose TSIR pattern will be optimized. The process run iteratively to update TSIR function parameters of the current visited cell.

Thus, the term of visited cell is used in the inner-loop iteration of the algorithm to optimize the TSIR functions with fixed performance index requirement. The target cell is visited one-by-one to update TSIR function parameters and interference. For the target cell visited in the current iteration to change its TSIR function parameters, it is referred to herein as the visited cell. This inner-loop will continue iterating until convergence.

After updating the interference of all the target cells, processing logic determines whether the PI(s) of cells converge (processing block 805). If not, the process transitions back to processing block 802 and the process repeats. If the PI(s) of the cells converge, then processing logic outputs the TSIR function of all target cells and their interference (processing block 806).

In some embodiments, each target cell will be visited sequentially according to a certain order. A number of different orders for visiting target cells may be used. For example, at each iteration, a cell can be randomly picked without replacement or the current selected cell needs to be the neighboring cell of the last selected cell. In some embodiments, the cell scanning module arbitrarily selects the order. In some embodiments, the order is adjusted based on the specific implementation of the network.

For every visited target cell, TSIR functions parameters can be updated to satisfy the fixed PI requirement. For example, TSIR function parameters can be adjusted to reduce the overall leakage interference and satisfy a certain average SINR. Minimization of the leakage interference is an example objective function that may be used to optimize TSIR functions. Other objective functions (e.g., maximization of cell throughput, etc.) may be used.

After the visit of one target cell, the updated TSIR functions will cause changes of uplink transmit power at served UEs, which will impact the overall uplink interference of the cellular network. Therefore, the received interference at each target cell needs to be re-evaluated. In some embodiments, the uplink interference is re-evaluated via the traffic data, where leakage interference from neighboring cells is re-calculated based on the updated TSIR functions and RSRP reports of traffic data. Then, the inferred interference will be a reflection of the total leakage from neighboring cells.

Figure 8B:
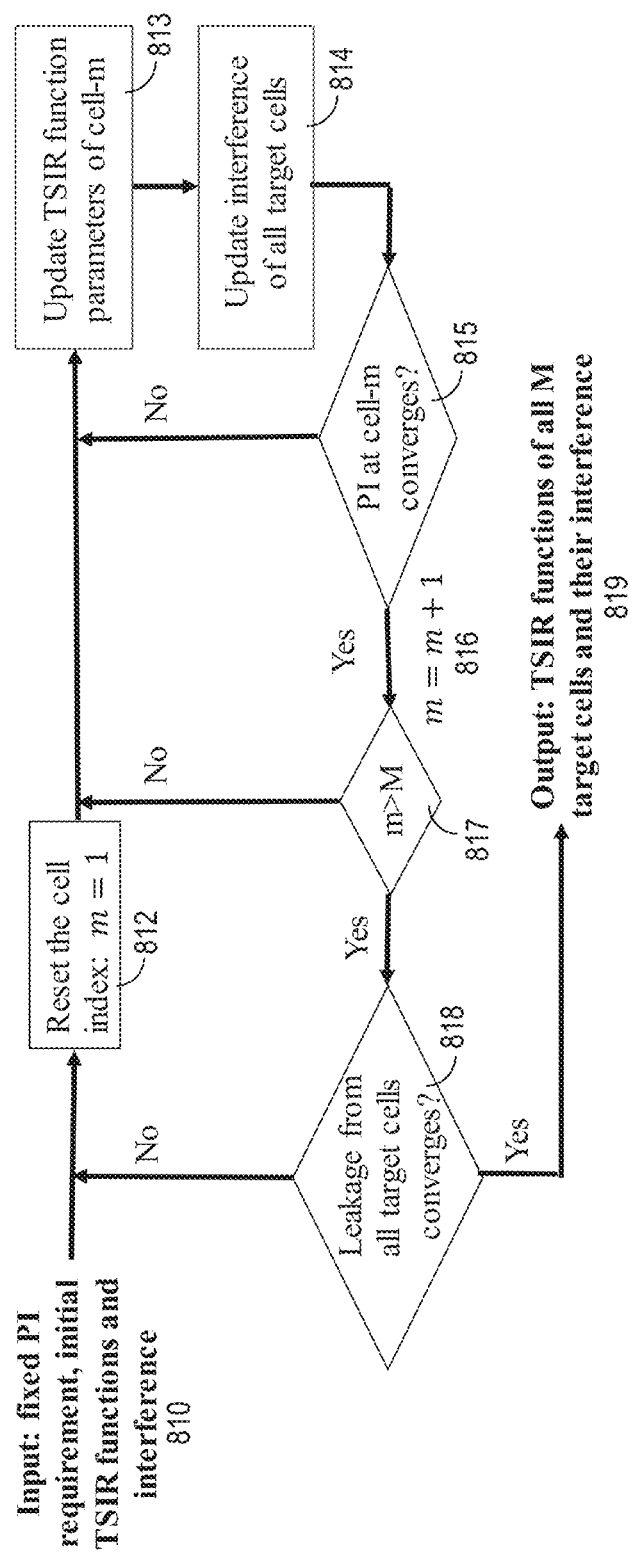
FIG. 8B illustrates another embodiment of the process performed by a self-scanning module.

FIG. 8B illustrates another embodiment of the process performed by a self-scanning module. In some embodiments, the module implemented, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 8B, processing logic receives fixed PI requirement and initial TSIR functions and interference (810) as an input to the self-scanning module. In response to the input, processing logic resets the cell index to 1 (processing block 812) and then updates the TSIR function parameters of $cell_m$ (processing block 813). After updating the TSIR function parameters of $cell_m$, processing logic updates the interference of all target cells (processing block 814) and then determines whether the PI at $cell_m$ converges (processing block 815). If it does not, processing logic transitions to processing block 813 where processing logic updates the TSIR function parameters of $cell_m$ again and that portion of the process repeats. If the PI at $cell_m$ does converge, processing logic transitions to processing block 817 where processing logic checks with the cell index m is greater than the total number of cells. If not, processing logic transitions back to processing block 813 and the process continues. If the cell index m is greater than M (a total number of target cells), the processing transitions of processing block 818 where processing logic checks whether the leakage from all target cells converges. If not, the process transitions to processing block 812. If the leakage from all target cells converges, processing logic outputs the TSIR functions of all M target cells and their interference (processing block 819).

One approach to update TSIR function parameters in each inner-iteration is as follows:

1) To reduce the leakage interference, TSIR function parameters of a cell can be updated at the boundary condition to satisfy the PI requirement. When linear TSIR model is adopted, and PI requirement on cell$_m$ is its average SINR no less than $q_m$, the update equations become:

$$a_m = \frac{-b_m E[\log L_{t,mk}] + q_m}{E[\log I_{tm}]}, b_m = \frac{-a_m E[\log I_{tm}] + q_m}{E[\log L_{t,mk}]}$$

The update equations of parameters for other objective functions, e.g., to maximize cell throughput One approach to update interference at a target cell is as follows: 1) re-calculate the leakage from neighboring cells based on the updated TSIR patterns and RSRP reports of traffic data; and calculate interference as the sum of leakage from neighboring cells.

Figure 9:
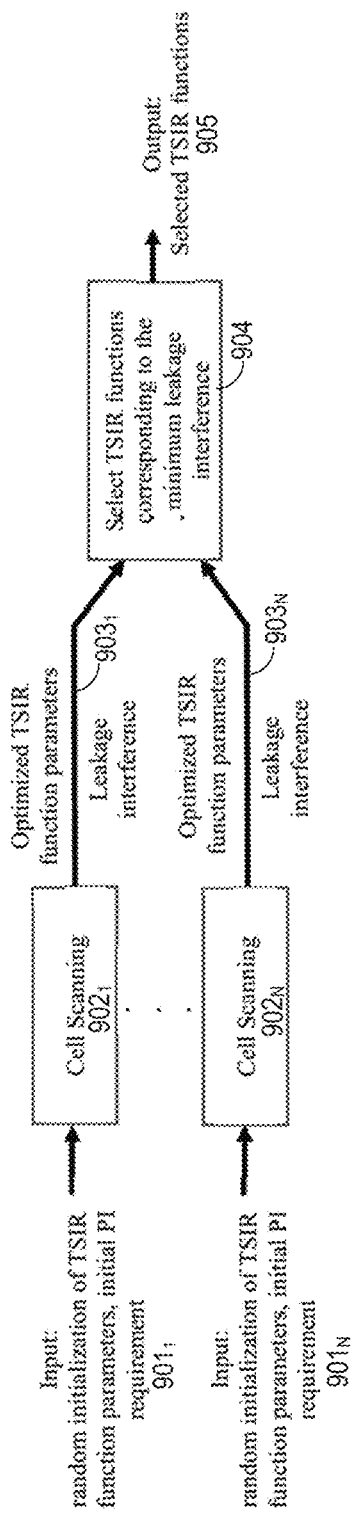
FIG. 9 is a data flow diagram of processing performed by one embodiment of initialization module.

FIG. 9 is a data flow diagram of processing performed by one embodiment of initialization module. In some embodiments, the module implemented, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 9, independent branches are launched in the initialization module, where each branch consists of a cell scanning module to optimize TSIR functions with a certain random initialization of TSIR function parameters and initial PI requirement. Specifically, cell-scanning modules 902$_1$-902$_N$ receive inputs in the form of random initialization of TSIR function parameters and initial PI requirements 901$_1$ through 901$_N$, respectively. In some embodiments, the input TSIR functions parameters are randomly generated, which are independent and different among the branches.

In response to these inputs, cell-scanning modules 902$_1$-902$_N$ generate optimized TSIR function parameters and leakage interference 903$_{1-N}$ to selection module 904 that selects the TSIR functions corresponding to the minimum leakage interference and outputs these selected TSIR functions (processing block 905). In some embodiments, a low requirement is used on the PI so that it leads to a solvable sub-problem on each branch with randomly initialized TSIR functions. A cost metric can be used to select the "best" branch, and its corresponding generated TSIR function parameters. An example of cost metric is leakage interference, i.e., select the branch with minimum total leakage. Another example of cost metric is total transmit power consumption, e.g., select the branch with lowest total transmit power consumption. The total transmit power consumption may be that of all served UEs in a cell or may be the maximum transmit power over all UEs. Other specific cost metrics may be used in selecting a proper set of initial TSIR functions. The selected TSIR function parameters are used as the input to the Greedy increment module described herein.

Figure 10:
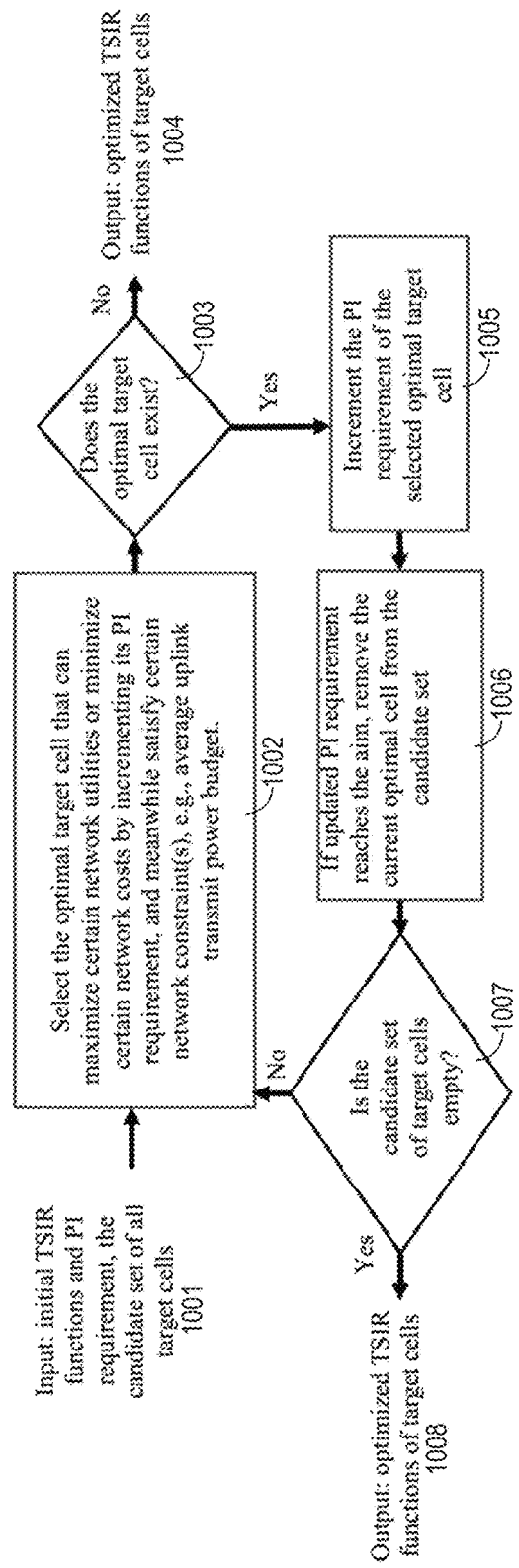
FIG. 10 is a data flow diagram of a process performed by one embodiment of a Greedy increment module that is used to iteratively improve the PI requirement.

FIG. 10 is a data flow diagram of a process performed by one embodiment of a Greedy increment module that is used to iteratively improve the PI requirement. In some embodiments, the module implemented, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 10, the inputs (1001) to the Greedy increment module are the selected set of initial TSIR functions from the initialization module, an initial PI requirement, and a candidate set of all target cells. In response to these inputs, processing logic select the optimal target cell that can maximize certain network utilities or minimize certain network costs by incrementing its PI requirement, and meanwhile satisfy certain network constraint(s) (e.g., average uplink transmit power budget (processing block 1002). In some embodiments, a candidate target cell is selected to increment its PI requirement if its increment can maximize certain network utilities, e.g., network throughput, or minimize certain network costs, e.g., total leakage interference, under the certain network constraints, e.g., average uplink transmit power budget.

Processing logic then determines if an optimal target cell exits (processing block 1003). If there is no such candidate cell to increment its PI requirement, the uplink transmit power saturates, and the Greedy increment module outputs the generated (e.g., optimized) TSIR functions. Otherwise, the PI requirement of the selected candidate cell is increased (processing block 1005). Depending on the specific implementations and applications, if the selected cell's PI requirement has reached its objective for certain use cases, processing logic can optionally remove this selected cell from the set of candidate cells (processing block 1006).

Processing logic determines if the candidate set of target cells is empty (processing block 1007). If the set of candidate cells is not empty, indicating there still exist cells waiting for performance improvement, the process transitions to processing block 1002 and the process of selecting the cell and incrementing its PI requirement will be reiterated. If the set of candidate cells is empty, indicating all target cells have reached its aimed PI requirement, then the Greedy increment module stops the iterations and generates the optimized TSIR functions (processing block 1008).

Figure 11:
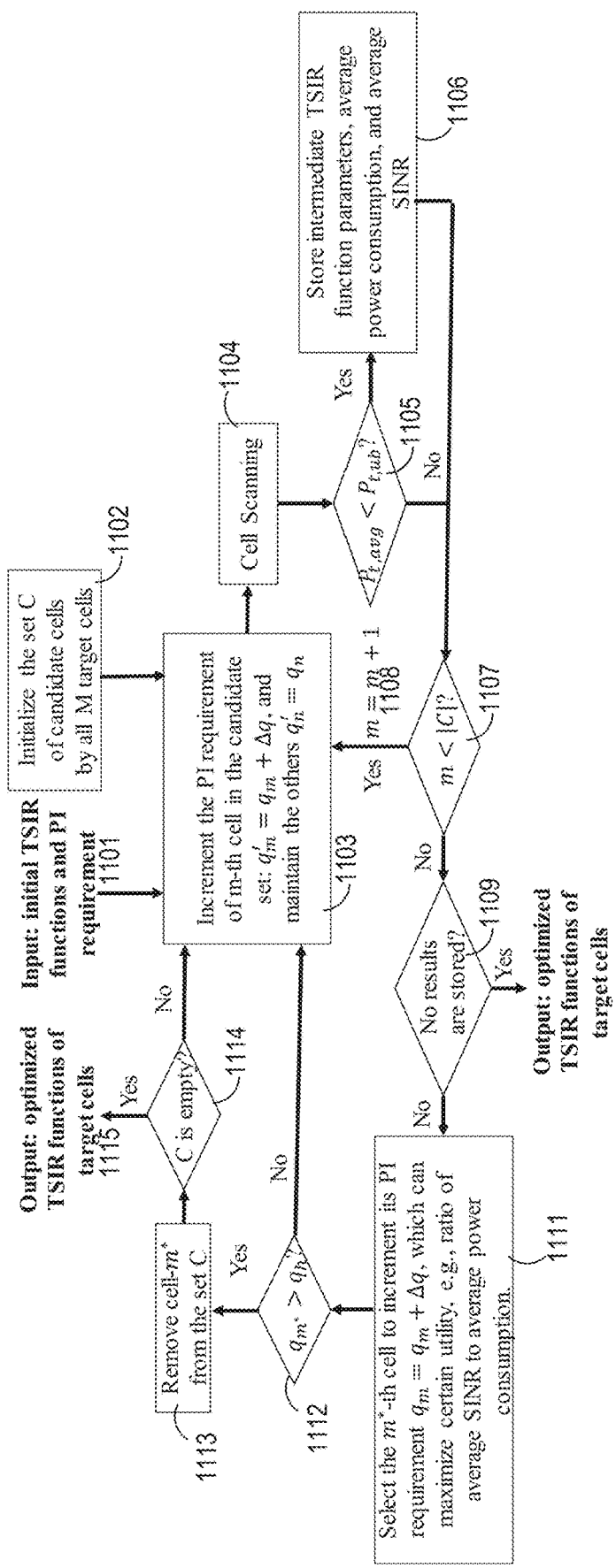
FIG. 11 is a data flow diagram of a process performed by another embodiment of a Greedy increment module with self-scanning.

FIG. 11 is a data flow diagram of a process performed by another embodiment of a Greedy increment module with self-scanning. In some embodiments, the module implemented, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 11, the process begins with using an initial TSIR function and PI requirement (1101) as an input. Processing logic also initializes this set C of candidate cells by all M target cells (processing block 1102).

In response to these inputs, processing logic increments the PI requirement of the $m_{th}$ cell in the candidate set:

$$q_m = q_m + \Delta q,$$

where $q_m$ is the PI requirement. Processing logic also maintain the other $q'_n = q_n$.

Thereafter processing logic performs self-scanning (processing block 1104) and checks whether the power average is less than the power (uplink bandwidth (ub) in one embodiment) (processing block 1105). Note that P{t, ub} at processing block 1105 represents the power constraint in the optimization. When one target cell's PI requirement gets improved, the average transmit power is more than P{t, ub} and the associated intermediate TSIR function parameters do not need to be stored. If the power average is less than the power, processing logic stores the intermediate TSIR function parameters, the average power consumption, and the average SINR and then transitions to processing block 1107. If the power average is not less than the power (UB), the process transitions to processing block 1107.

At processing block 1107, processing logic checks whether the absolute value of C is greater than the index M, where C is defined as the set of candidate cells that can be selected to improve the PI requirement, which is initialized by all target cells whose TSIR patterns need to be optimized. |C| means the cardinality (size) of set C, i.e., number of candidate cells in the set C. In some embodiments, the cell's performance index q value gets increased gradually as part of the algorithm. The cell whose performance index q has already reached $q_h$ will be removed from the candidate set C. If so, processing logic increments m by 1 and transitions back to processing block 1103 to repeat the process. If not, the processing logic checks whether no results have been stored. If so, processing logic outputs the optimized TSIR functions of the target cells. If not, processing logic transitions to processing block 1111 where processing logic selects the $m_{th}$ cell to increment its PI requirement $q_m = q_m + \Delta q$, which maximizes a certain utility (e.g., ratio of average SNIR to average power consumption, etc.).

Thereafter, processing logic checks whether the PI requirement is for the m*th cell is greater than the PI requirement $q_h$, where $q_h$ is an upper bound constraint of the performance index for each cell (e.g., the average SINR, etc.). In some embodiments, the algorithm selects the cell to improve its q value and iterate this process. In some embodiments, there is no need to continue improving a cell with a very good performance, which is why there is a $q_h$ constraint here. Whenever a target cell's q value (e.g., average SINR, etc.) has reached $q_h$, this cell will be removed from the candidate set C, and it will not be selected in the future iterations to improve its q value. If not, processing logic transitions to processing block 1103 and the process repeats. If the PI requirement has been met, processing logic transitions to processing block 1113 where processing logic removes $cell_m$* from the set C and then checks whether C is empty (processing block 1114). If not, processing logic transitions to processing block 1103 and the process repeats. If it is, processing logic outputs generated (e.g., optimized) TSIR functions of target cells (processing block 1115).

Depending on the specific implementations, different required formats of TSIR patterns/tables may be used. In some embodiments, the Extraction module approximates the parametric TSIR functions by using some samples of TSIR values and forms the TSIR patterns with the required format.

Figure 12A:
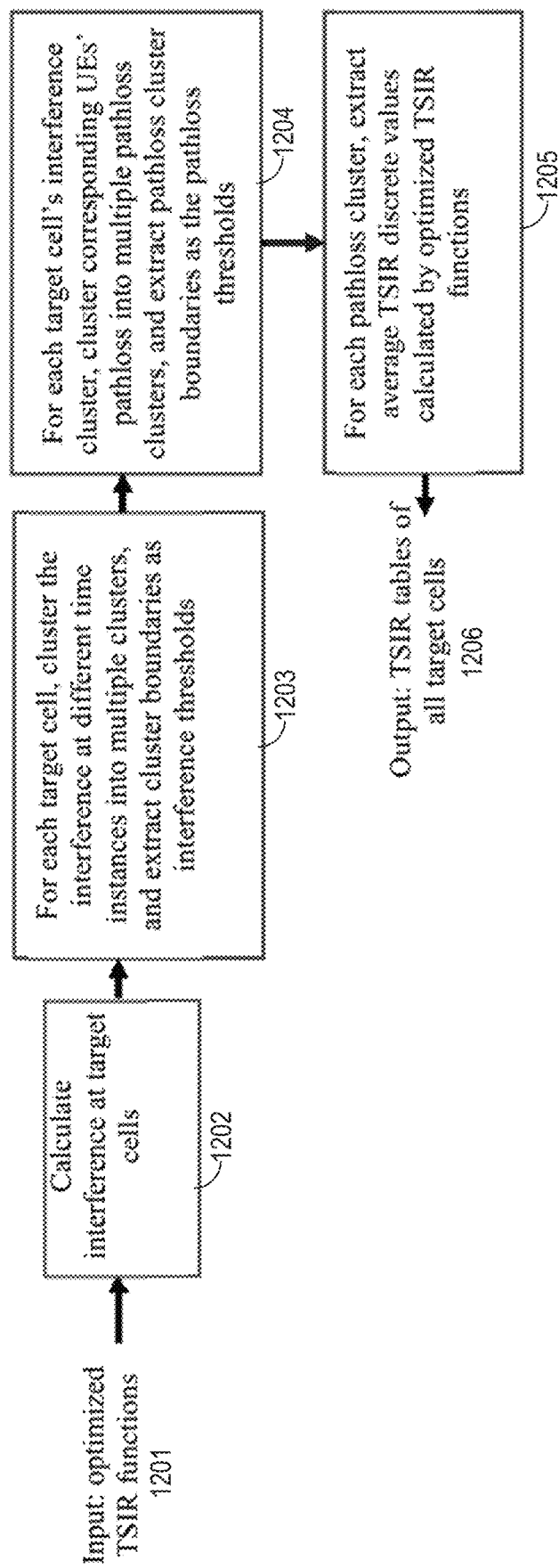
FIG. 12A is a flow diagram of a process performed by one embodiment of an extraction module.

FIG. 12A is a flow diagram of a process performed by one embodiment of an extraction module. In some embodiments, the module implemented, at least in part, by processing logic comprising hardware (e.g., circuitry, dedicated logic, etc.), software (e.g., software running on a chip, software run on a general-purpose computer system or a dedicated machine, etc.), firmware, or a combination of the three.

In some embodiments, the average TSIR values, calculated from parametric TSIR functions, of joint interference-and-pathloss bins are used to form the TSIR pattern. In some embodiments, the extraction module first calculates the interference at target cells with the optimized TSIR functions based on the traffic data. Then, in some embodiments, the extraction module performs clustering over time, where each time cluster represents a typical uplink interference level. For each time cluster, UEs are separated into groups based on pathloss, and pathloss boundaries can be extracted for each time cluster. Given a pathloss cluster within a certain time cluster, an average TSIR value can be calculated by the parametric TSIR functions and traffic data dropping in this cluster. A TSIR pattern (e.g., a pattern represented in a table, etc.) can then be formed by these average TSIR values, where each TSIR value corresponds to a certain joint range of interference and UE pathloss.

Referring to FIG. 12A, the process begins with optimized TSIR functions (1201). Using the optimized TSIR functions (1201), processing logic calculates the interference of target cells (processing block 1202). For each target cell, processing logic clusters the interference at different time instances into multiple clusters and extracts cluster boundaries at interference thresholds (processing block 1203). Also for each target cells interference cluster, processing logic clusters corresponding UEs' path loss into multiple path loss clusters and extracts path loss cluster boundaries as the path loss thresholds (processing block 1204).

For each path loss cluster, processing logic also extracts the average TSIR discreet values calculated by the optimized TSIR functions (processing block 1205). Thereafter, the processing logic outputs the TSIR tables of all target cells 1206.

Figure 12B:
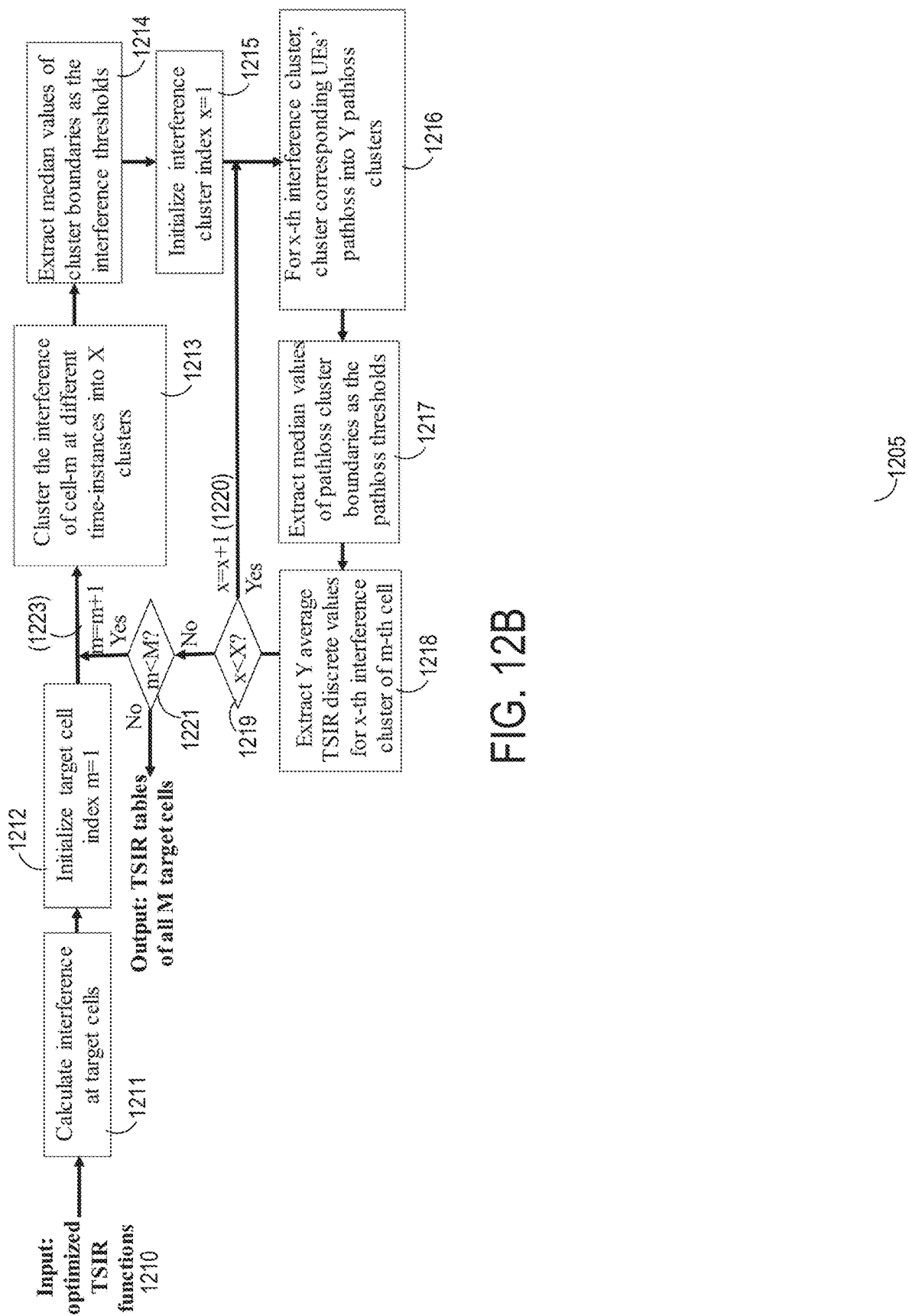
FIG. 12B is a data flow diagram of a process performed by another embodiment of an extraction module.

FIG. 12B is a data flow diagram of a process performed by another embodiment of an extraction module. In some embodiments, the module implemented, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 12B, the process begins with optimized TSIR function (1210) as an input. Using the optimized TSIR function (1210), processing logic calculates the interference at target cells (processing block 1211) and initializes the target cell index m to 1 (processing block 1212). Next, processing logic clusters the interference of $cell_m$ at different time instances into X clusters (processing block 1213). Then, processing logic extracts the medium values of the cluster boundaries as interference thresholds (processing block 1214) and initializes the interference cluster index x to 1 (processing block 1215).

For the x-th interference cluster, processing logic clusters the corresponding UEs path loss into Y path loss clusters (processing block 1216), extracts the values of the path loss cluster boundaries as the path loss threshold (processing block 1217), and extracts the Y average TSIR discreet values for the x-th interference cluster of the m-th cell (processing block 1218).

Next processing logic checks whether the interference cluster index x is less than the total number of clusters X. If so, the interference cluster index x is incremented by 1 and the process transitions to processing block 1216 where the process repeats. If the interference cluster index x is not less than the total number of clusters X, the process transitions to processing block 1221 where processing logic checks whether the cell index m is less than the total number of target cells M. If so, the target cell index m is incremented by 1 and the process returns to processing block 1213 where the process repeats. If not, the processing logic outputs TSIR tables of all M target cells (processing block 1222).

Note that the techniques disclosed herein are not limited to perform clustering over time by interference or UEs by pathloss. Typical clustering methods, e.g., Kmeans, can be directly applied. In some embodiments, the number of clusters depends on the required format of TSIR patterns, which is application-specific. In some embodiments, the final output of this module is the target cells' TSIR patterns, including interference thresholds, pathloss thresholds, and TSIR values corresponding ranges specified by interference/pathloss thresholds.

Figure 13:
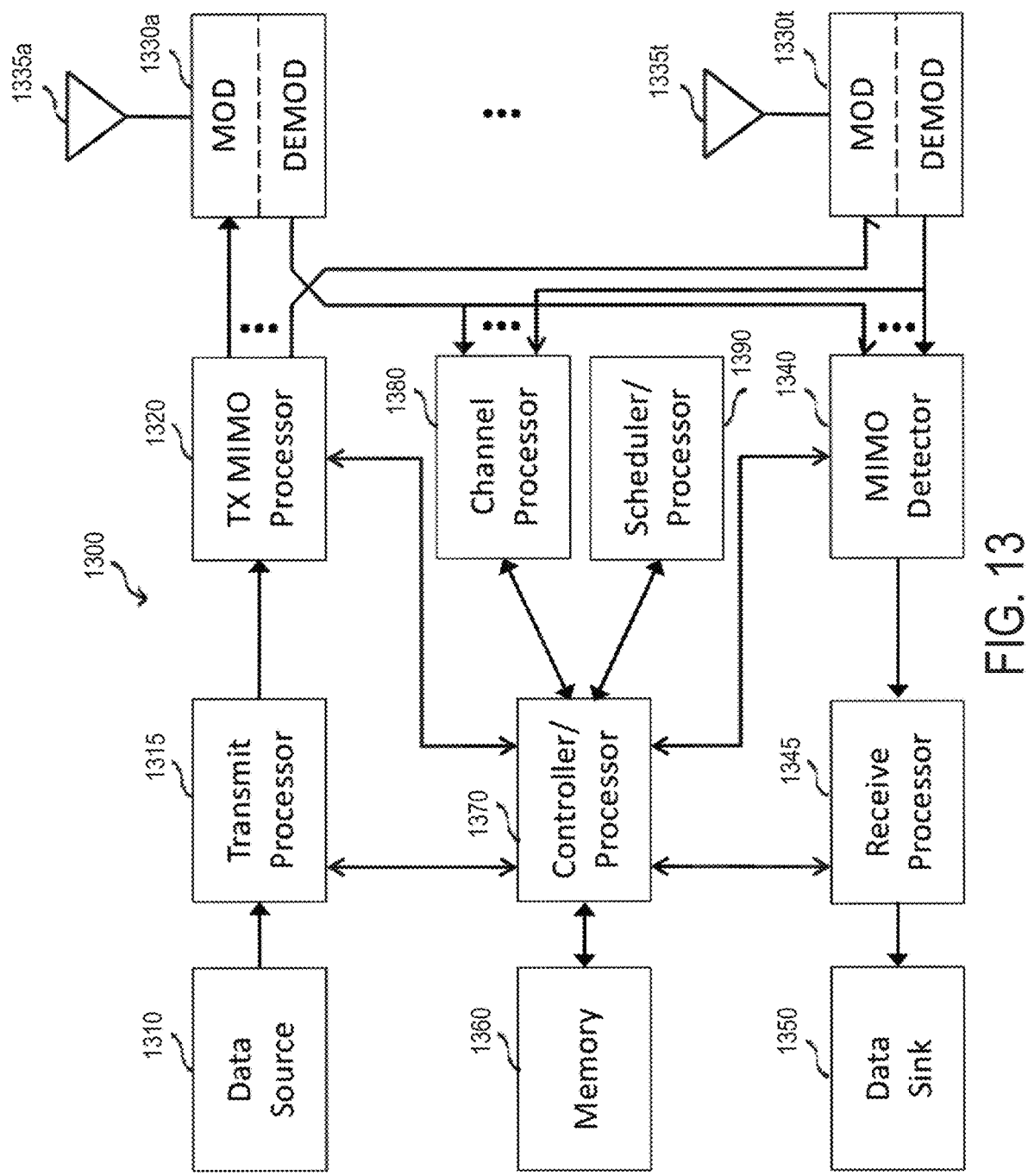
FIG. 13 is a block diagram of one embodiment of a base station.

FIG. 13 is a block diagram of one embodiment of a base station. Referring to FIG. 13, in one embodiment, base station 1300 serves one or more cells and is equipped with $N_t$ antennas, 1335$_a$ through 1335$_t$. Base station 1300 includes a transmit processor 1315 that receives data for one or more UE from a data source 1310, processes the data for each UE, and transmits data for each UE. In one embodiment, processor 1315 also receives and processes information from a controller processor 1370 and provides control symbols. In one embodiment, processor 1315 also generates reference symbols for one or more reference signals. A transmit (TX) MIMO processor 1320 performs precoding on the data symbols, the control symbols, and/or the reference symbols for each UE based on one or more precoding vectors determined for that UE. In one embodiment, processor 1320 provides (up to) $N_t$ output streams, one to each of the modulators (MODs) in modules 1330a through 1330t. Each modulator 1330 processes its respective stream (e.g., for OFDM, etc.) to obtain an output sample stream. Each modulator 1330 further processes (e.g., convert to analog, amplify, filter, upconvert, etc.) the output sample stream to obtain a downlink signal. Up to $N_t$ output streams from modulators 1330a through 1330t are transmitted via $N_t$ antennas 1335a through 1335t, respectively.

The uplink signals from UEs are received by antennas 1335, processed by demodulators 1330, detected by a MIMO detector 1340 and further processed by a receive processor 1345 to obtain decoded data and control information sent by UEs. Processor 1345 provides the decoded data to a data sink 1350 and the decoded control information to controller/processor 1370.

A channel processor 1380 at base station 1300 estimates the channel response from UE 200 and other UEs of interest and provides a channel matrix for each UE. In one embodiment, processor 1370 and/or 1380 determines channel information based on channel matrix for each UE of interest. In accordance with one embodiment, processor 1380 stores determined channel matrix in memory module 1360, for later use.

In one embodiment, scheduler 1390 schedules UEs for data transmission on the downlink and/or uplink. Scheduler 1390 and/or other processors and modules at base station 1300 may perform processes for the techniques described herein. These include, scheduling transmission of control information in the uplink by UEs.

Controller/processor 1370 direct the operation at base station 1300. Memory 1360 may store data and program codes for base station 1300.

In some embodiments, base station collect RSRP reports of served UEs. That is, data corresponding to the RSRP reports are received with one or more of antennas 1335a through 1335t, processed by demodulators 1330, detected by a MIMO detector 1340 and further processed by a receive processor 1345 to obtain decoded data representing the RSRP reports. The received RSRP reports are stored in memory 1360.

In some embodiments, controller/processor 1370, which includes one or more processors, is operable to estimate interference received from one or more UEs served by another base station, determine a TSIR based on a table created by the network entity as described herein, calculate UE transmit power for one or more of the UEs, and send information, via the transceiver, indicating the UE transmit power to the one or more UEs. The table is received from the network entity via received via antennas 1335$_a$ through 1335$_t$, demodulators 1330, MIMO detector 1340 and further processed by a receive processor 1345. The table is in from memory 1360. In some embodiments, the one or more processors are operable to determine the TSIR based on the table and one or more of: its current uplink interference data and interference of one or both of collocated cells and sectors at the base station. In one embodiment, the one or more processors are operable to determine the TSIR based on the table and historical interference and/or previously selected TSIR pattern(s). In some embodiments, historical interference and/or previously selected TSIR pattern(s) are stored and obtained from memory 1360.

There are a number of example embodiments described herein.

Example 1 is a network entity in a communication system supporting the uplink power control by the design of target signal-to-interference-plus-noise-ratio (TSIR) patterns for one or more cells in the target area, the network entity comprising: a transceiver to receive reported traffic data from one or more cells in the target area; and a TSIR generation engine having one or more processors configured to automatically generate the one or more TSIR patterns for the one or more cells of the target area in response to one or more trigger conditions, wherein the transceiver component is operable to transmit at least one of the one or more TSIR patterns to one or more cells in the target area.

Example 2 is the network entity of example 1 that may optionally include that the TSIR generation engine automatically generates the one or more TSIR patterns by choosing one or more parametric TSIR functions and/or their parameters based on the reported traffic data for one or more cells of the target area, each of the one or more parametric TSIR functions related to one or more of uplink interference and pathloss and being cell-specific or specific to a group of one or more cells.

Example 3 is the network entity of example 1 that may optionally include that the TSIR generation engine automatically generates the one or more TSIR patterns by: initializing one or more parametric TSIR functions to satisfy requirements of one or more performance indices (PIs) for one or more cells of the target area in response to occurrence of the one or more trigger conditions; updating the TSIR function parameters of one or more cells with modified PI requirements until PI requirements of cells reach or exceed a target value or uplink transmit power saturates; and forming one or more tables representing TSIR patterns in response to the updated parametric TSIR functions.

Example 4 is the network entity of example 3 that may optionally include that the one or more parametric TSIR functions include cell-specific and/or user-group-specific parameters related to uplink interference and pathloss.

Example 5 is the network entity of example 3 that may optionally include that the one or more tables comprises at least two tables representing TSIR patterns created in response to triggers by independent conditions for each cell, and wherein the merging the tables representing TSIR patterns.

Example 6 is the network entity of example 3 that may optionally include that the TSIR generation engine is further configured to create one or more parametric TSIR functions based on the collected traffic data for one or more cells of the target area.

Example 7 is the network entity of example 3 that may optionally include that each of the one or more parametric TSIR functions is related to one or more of uplink interference and pathloss and each of the one or more parametric TSIR functions is either cell-specific or specific to a group of cells.

Example 8 is the network entity of example 1 that may optionally include that the reported traffic data includes interference data of neighboring cells controlled by a single base station and the one or more tables is generated based on the interference data of the neighboring cells and transmitted by the transmitter to the single base station.

Example 9 is a method for controlling uplink power between in a communication system, comprising: receiving reported traffic data from one or more cells in a target area; automatically generating the one or more signal-to-interference-plus-noise-ratio (TSIR) patterns for the one or more cells of the target area in response to one or more trigger conditions; and transmitting at least one of the one or more TSIR patterns to one or more cells in the target area.

Example 10 is the method of example 9 that may optionally include that automatically generating the one or more TSIR patterns comprises choosing one or more parametric TSIR functions and/or their parameters based on the reported traffic data for one or more cells of the target area, each of the one or more parametric TSIR functions related to one or more of uplink interference and pathloss and each of the one or more parametric TSIR functions being cell-specific or specific to a group of one or more cells.

Example 11 is the method of example 9 that may optionally include that automatically generating the one or more TSIR patterns comprises: initializing one or more parametric TSIR functions to satisfy requirements of one or more performance indices (PIs) for one or more cells of the target area in response to occurrence of the one or more trigger conditions; updating the TSIR function parameters of one or more cells with modified PI requirements until PI requirements of cells reach or exceed a target value or uplink transmit power saturates; and forming one or more tables representing TSIR patterns in response to the updated parametric TSIR functions.

Example 12 is the method of example 11 that may optionally include that the one or more tables comprise at least two tables representing TSIR patterns created in response to triggers by independent conditions for each cell, and further comprising merging the tables representing TSIR patterns.

Example 13 is the method of example 11 that may optionally include transmitting at least one of the one or more tables to a base station in the target area.

Example 14 is the method of example 11 that may optionally include that the one or more triggers comprises one or more of an expiration of a period of time or occurrence of a network anomaly.

Example 15 is the method of example 11 that may optionally include that at least one of the one or more TSIR patterns is a result of combining two or more TSIR patterns.

Example 16 is the method of example 15 that may optionally include that each of the two or more TSIR patterns are generated in response to a distinct trigger.

Example 17 is one or more non-transitory computer readable storage media having instructions stored thereupon which, when executed by a system having at least a processor and a memory therein, cause the system to perform operations for controlling uplink power between in a communication system, comprising: receiving reported traffic data from one or more cells in a target area; automatically generating the one or more signal-to-interference-plus-noise-ratio (TSIR) patterns for the one or more cells of the target area in response to one or more trigger conditions; and transmitting at least one of the one or more TSIR patterns to one or more cells in the target area.

Example 18 is the one or more non-transitory computer readable storage media of example 17 that may optionally include that automatically generating the one or more TSIR patterns comprises choosing one or more parametric TSIR functions and/or their parameters based on the reported traffic data for one or more cells of the target area, each of the one or more parametric TSIR functions related to one or more of uplink interference and pathloss and each of the one or more parametric TSIR functions being cell-specific or specific to a group of one or more cells.

Example 19 is the one or more non-transitory computer readable storage media of example 17 that may optionally include that automatically generating the one or more TSIR patterns comprises: initializing one or more parametric TSIR functions to satisfy requirements of one or more performance indices (PIs) for one or more cells of the target area in response to occurrence of the one or more trigger conditions; updating the TSIR function parameters of one or more cells with modified PI requirements until PI requirements of cells reach or exceed a target value or uplink transmit power saturates; and forming one or more tables representing TSIR patterns in response to the updated parametric TSIR functions.

Example 20 is a base station comprising: a transceiver to collect RSRP reports of served user equipments (UEs); and one or more processors coupled to the transceiver and operable to: estimate interference received from one or more UEs served by another base station, determine a target signal-to-interference-plus-noise-ratio (TSIR) from a table created using the method of example 9, calculate UE transmit power for one or more of the UEs, and send information indicating the UE transmit power to the one or more UEs.

Example 21 is the base station of example 20 that may optionally include that the one or more processors are operable to determine the TSIR based on the table and one or more of: its current uplink interference data and interference of one or both of collocated cells and sectors at the base station.

Example 22 is the base station of example 20 that may optionally include that the one or more processors are operable to determine the TSIR based on the table and one or more of: historical interference; and one or more previously selected TSIR patterns.

Example 23 is the base station of example 20 that may optionally include that the table is created and/or receiving using one or more of the methods of claims 9-15.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general-purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula (e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

In addition to any other claims, the applicant(s)/inventor(s) claim each and every embodiment of the technology described herein, as well as any aspect, component, or element of any embodiment described herein, and any combination of aspects, components or elements of any embodiment described herein.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A network entity in a communication system supporting the uplink power control by the design of target signal-to-interference-plus-noise-ratio (TSIR) patterns for one or more cells in the target area, the network entity comprising:
   a transceiver to receive reported traffic data from one or more cells in the target area, the reported traffic data including one or more of interference data and received signal data; and
   a TSIR generation engine having one or more processors configured to automatically generate the one or more TSIR patterns for the one or more cells of the target area in response to one or more trigger conditions and using the reported traffic data, wherein satisfaction of a condition of the one or more trigger conditions causes the TSIR generation engine to automatically generate the one or more TSIR patterns for the one or more cells by updating TSIR function parameters of a cell to satisfy a performance requirement using the reported traffic data,
   wherein the transceiver component is operable to transmit at least one of the one or more TSIR patterns to one or more cells in the target area.

2. The network entity of claim 1 wherein the TSIR generation engine automatically generates the one or more TSIR patterns by choosing one or more parametric TSIR functions and/or their parameters based on the reported traffic data for one or more cells of the target area, each of the one or more parametric TSIR functions related to one or more of uplink interference and pathloss and being cell-specific or specific to a group of one or more cells.

3. The network entity of claim 1 wherein the TSIR generation engine automatically generates the one or more TSIR patterns by:
   initializing one or more parametric TSIR functions to satisfy requirements of one or more performance indices (PIs) for one or more cells of the target area in response to occurrence of the one or more trigger conditions;
   updating the TSIR function parameters of one or more cells with modified PI requirements until PI requirements of cells reach or exceed a target value or uplink transmit power saturates; and
   forming one or more tables representing TSIR patterns in response to the updated parametric TSIR functions.

4. The network entity of claim 3 wherein the one or more parametric TSIR functions include cell-specific and/or user-group-specific parameters related to uplink interference and pathloss.

5. The network entity of claim 3 wherein the one or more tables comprises at least two tables representing TSIR patterns created in response to triggers by independent conditions for each cell, and wherein the merging the tables representing TSIR patterns.

6. The network entity of claim 3 wherein the TSIR generation engine is further configured to create one or more parametric TSIR functions based on the collected traffic data for one or more cells of the target area.

7. The network entity of claim 3 wherein each of the one or more parametric TSIR functions is related to one or more of uplink interference and pathloss and each of the one or more parametric TSIR functions is either cell-specific or specific to a group of cells.

8. The network entity of claim 1 wherein the reported traffic data includes interference data of neighboring cells controlled by a single base station and the one or more tables is generated based on the interference data of the neighboring cells and transmitted by the transmitter to the single base station.

9. A method for controlling uplink power between in a communication system, comprising:
   receiving reported traffic data from one or more cells in a target area, the reported traffic data including one or more of interference data and received signal data;
   automatically generating the one or more signal-to-interference-plus-noise-ratio (TSIR) patterns for the one or more cells of the target area in response to one or more trigger conditions and using the reported traffic data, wherein satisfaction of a condition of the one or more trigger conditions causes the TSIR generation engine to automatically generate the one or more TSIR patterns for the one or more cells by updating TSIR function parameters of a cell to satisfy a performance requirement using the reported traffic data; and
   transmitting at least one of the one or more TSIR patterns to one or more cells in the target area.

10. The method of claim 9 wherein automatically generating the one or more TSIR patterns comprises choosing one or more parametric TSIR functions and/or their parameters based on the reported traffic data for one or more cells of the target area, each of the one or more parametric TSIR functions related to one or more of uplink interference and pathloss and each of the one or more parametric TSIR functions being cell-specific or specific to a group of one or more cells.

11. The method of claim 9 wherein automatically generating the one or more TSIR patterns comprises:
   initializing one or more parametric TSIR functions to satisfy requirements of one or more performance indices (PIs) for one or more cells of the target area in response to occurrence of the one or more trigger conditions;
   updating the TSIR function parameters of one or more cells with modified PI requirements until PI requirements of cells reach or exceed a target value or uplink transmit power saturates; and
   forming one or more tables representing TSIR patterns in response to the updated parametric TSIR functions.

12. The method of claim 11 wherein the one or more tables comprise at least two tables representing TSIR patterns created in response to triggers by independent conditions for each cell, and further comprising merging the tables representing TSIR patterns.

13. The method of claim 11 further comprising transmitting at least one of the one or more tables to a base station in the target area.

14. The method of claim 11 wherein the one or more triggers comprises one or more of an expiration of a period of time or occurrence of a network anomaly.

15. The method of claim 11 wherein at least one of the one or more TSIR patterns is a result of combining two or more TSIR patterns.

16. The method of claim 15 wherein each of the two or more TSIR patterns are generated in response to a distinct trigger.

17. A base station comprising:
   a transceiver to collect RSRP reports of served user equipments (UEs); and
   one or more processors coupled to the transceiver and operable to:
      estimate interference received from one or more UEs served by another base station,
      determine a target signal-to-interference-plus-noise-ratio (TSIR) based on a table created using the method of claim 10,
      calculate UE transmit power for one or more of the UEs, and
      send information indicating the UE transmit power to the one or more UEs.

18. The base station of claim 17 wherein the one or more processors are operable to determine the TSIR based on the table and one or more of: its current uplink interference data and interference of one or both of collocated cells and sectors at the base station.

19. The base station of claim 17 wherein the one or more processors are operable to determine the TSIR based on the table and one or more of:
   historical interference; and
   one or more previously selected TSIR patterns.

20. The base station of claim 17 wherein the one or more TSIR patterns are created based on one or more parametric TSIR functions and/or their parameters based on the reported traffic data for one or more cells of the target area, and each of the one or more parametric TSIR functions is related to one or more of uplink interference and pathloss and each of the one or more parametric TSIR functions is cell-specific or specific to a group of one or more cells.

* * * * *